US010649076B2

(12) United States Patent
Schoor et al.

(10) Patent No.: US 10,649,076 B2
(45) Date of Patent: May 12, 2020

(54) RADAR MEASURING METHOD

(71) Applicant: Robert Bosch GmbH, Stuttgart (DE)

(72) Inventors: Michael Schoor, Stuttgart (DE); Benedikt Loesch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 468 days.

(21) Appl. No.: 15/320,152

(22) PCT Filed: Apr. 23, 2015

(86) PCT No.: PCT/EP2015/058749
§ 371 (c)(1),
(2) Date: Dec. 19, 2016

(87) PCT Pub. No.: WO2015/197222
PCT Pub. Date: Dec. 30, 2015

(65) Prior Publication Data
US 2017/0131396 A1   May 11, 2017
US 2019/0353769 A9   Nov. 21, 2019

Related U.S. Application Data

(63) Continuation-in-part of application No. 14/443,296, filed as application No. PCT/EP2013/069912 on Sep. 25, 2013, now Pat. No. 10,012,726.

(30) Foreign Application Priority Data

Nov. 15, 2012   (DE) .................. 10 2012 220 879
Jun. 26, 2014   (DE) .................. 10 2014 212 280

(51) Int. Cl.
*G01S 13/58*   (2006.01)
*G01S 13/931*   (2020.01)
(Continued)

(52) U.S. Cl.
CPC ............ *G01S 13/583* (2013.01); *G01S 7/354* (2013.01); *G01S 13/0209* (2013.01);
(Continued)

(58) Field of Classification Search
CPC ...... G01S 13/02; G01S 13/0209; G01S 13/34; G01S 13/343; G01S 13/345; G01S 13/50;
(Continued)

(56) References Cited

U.S. PATENT DOCUMENTS 7,639,171 B2 * 12/2009 Alland .................. G01S 7/034
                                                          342/171
2009/0219190 A1 * 9/2009 Lehre .................... G01S 7/352
                                                          342/71
(Continued)

FOREIGN PATENT DOCUMENTS

DE   102009000468 A1   8/2009
DE   102012212888 A1   1/2014
(Continued)

OTHER PUBLICATIONS

International Search Report dated Jul. 13, 2015, issued in the underlying International Application PCT/EP2015/058749 filed Apr. 23, 2015.

*Primary Examiner* — Vladimir Magloire
*Assistant Examiner* — Michael W Justice
(74) *Attorney, Agent, or Firm* — Norton Rose Fulbright US LLP; Gerard Messina

(57) ABSTRACT

An FMCW radar sensor and method for determining a relative velocity of a radar target, in which an FMCW radar measurement is performed with a transmitted signal whose modulation pattern encompasses mutually temporally interleaved sequences of ramps; from the baseband signals a two-dimensional spectrum is calculated separately for each of the sequences; from a position of a peak in at least one
(Continued)

two-dimensional spectrum of the baseband signals, values for the relative velocity of a radar target which are periodic with a predetermined velocity period are determined; a phase relationship between spectral values that are obtained respectively at the same position in the separately calculated two-dimensional spectra is checked for agreement with phase relationships expected for several of the determined periodic values of the relative velocity; and based thereon, an estimated value for the relative velocity of the target is selected from the determined periodic values of the relative velocity.

13 Claims, 3 Drawing Sheets

(51) Int. Cl.
    *G01S 13/34*     (2006.01)
    *G01S 7/35*     (2006.01)
    *G01S 13/02*     (2006.01)

(52) U.S. Cl.
    CPC ............ *G01S 13/34* (2013.01); *G01S 13/931* (2013.01); *G01S 13/343* (2013.01); *G01S 2007/356* (2013.01)

(58) Field of Classification Search
    CPC ...... G01S 13/58; G01S 13/583; G01S 13/584; G01S 13/93; G01S 13/931; G01S 7/35; G01S 7/352; G01S 7/354; G01S 2007/356

See application file for complete search history.

(56) References Cited

U.S. PATENT DOCUMENTS

| | | | |
|---|---|---|---|
| 2010/0289692 A1* | 11/2010 | Winkler | G01S 7/4008 342/70 |
| 2012/0049860 A1* | 3/2012 | Heilmann | G01S 13/424 324/629 |
| 2012/0146835 A1* | 6/2012 | Gross | G01S 7/35 342/109 |
| 2012/0235854 A1 | 9/2012 | Testar | |
| 2014/0022111 A1* | 1/2014 | Kuehnle | G01S 13/584 342/109 |
| 2015/0331096 A1* | 11/2015 | Schoor | G01S 13/343 342/112 |

FOREIGN PATENT DOCUMENTS

| | | |
|---|---|---|
| DE | 102012220879 A1 | 5/2014 |
| EP | 1325350 B1 | 10/2007 |
| JP | 2008111743 A | 5/2008 |
| JP | 2013156012 A | 8/2013 |
| WO | 2013156012 A1 | 10/2013 |

\* cited by examiner

RADAR MEASURING METHOD

The present application is the U.S. national stage of International Pat. App. No. PCT/EP2015/058749 filed Apr. 23, 2015, is a continuation-in-part of U.S. patent application Ser. No. 14/443,296, which is the U.S. national stage of International Pat. App. No. PCT/EP2013/069912 filed Sep. 25, 2013, and claims priority under 35 U.S.C. § 119 to German patent application nos. 10 2014 212 280.5 filed Jun. 26, 2014 and 10 2012 220 879.8 filed Nov. 15, 2012.

FIELD

The present invention relates to a method for determining a relative velocity of a radar target.

The present invention further relates to a radar sensor, in particular for motor vehicles, that is configured to carry out that method.

BACKGROUND INFORMATION

In motor vehicles, FMCW radar sensors are used to detect the traffic environment, in particular to localize other vehicles. The localization results can be used for a variety of assistance functions, for example for automatic separation control, automatic collision warning, or also automatic triggering of an emergency braking procedure in the case of an acute risk of collision.

In frequency modulated continuous wave (FMCW) radar sensors, a transmitted signal whose transmission frequency is modulated in ramp-shaped fashion is used, the signal being transmitted continuously during the course of the ramp. A baseband signal is generated from a received signal by mixing with the transmitted signal, and is sampled and evaluated.

The frequency of the baseband signal corresponds to the frequency difference between the signal transmitted at a given point in time and the signal received at the same point in time. Because of the frequency modulation of the transmitted signal, this frequency difference depends on the transit time of the signal from the radar sensor to the object and back, and thus on the distance of the object. Because of the Doppler effect, however, the frequency difference also contains a component that is conditioned by the relative velocity of the object. A measurement of the frequency difference on a single ramp therefore does not yet permit a determination of the distance and the relative velocity, but instead supplies only a linear relationship between those variables. This relationship can be depicted as a straight line on a distance-velocity diagram (d-v diagram).

There are conventional FMCW radar sensors that work with a sequence of identical, comparatively short ramps, called "rapid chirps," which have a large frequency swing in relation to their duration and are therefore so steep that the distance-dependent component of the frequency shift dominates in the baseband signal while the Doppler shift is sampled by the sequence of ramps. A sufficiently high repetition rate of the short ramps is therefore necessary in order to arrive at an unambiguous determination of the relative velocity within a desired measurement region of the relative velocity. In particular, the time offset between successive short ramps must be less than half the period length of the Doppler frequency.

In order to enable an accurate estimate of the velocity and distance of radar objects with a minimal hardware outlay and computation outlay, it has been proposed to use several successive sequences of frequency modulation ramps with a temporal spacing of the ramps, in which an undersampling of the Doppler shift occurs over the sequence of ramps so that the information obtained regarding the relative velocity is affected by an ambiguity. By selecting different ramp parameters for the sequences, relative velocity values having different ambiguities and different linear correlations between the distance and velocity can be ascertained from the different sequences. A method of this kind, in which two sequences of short ramps having a different ramp repetition time are transmitted in succession, is described, for example, in German Patent Application No. DE 10 2012 212 888 A1. A value for the relative velocity of an object is determined by equalizing the information obtained for the different sequences.

SUMMARY

The object of the present invention is to provide a method for determining a relative velocity of a radar target which permits a more accurate estimate of the relative velocity.

The object may be achieved according to the present invention by a method for determining a relative velocity of a radar target in which:

(a) an FMCW radar measurement is performed in which a transmitted signal frequency-modulated in ramp-shaped fashion is transmitted, the modulation pattern of which signal encompasses a first sequence of ramps following one another in time-offset fashion at a time interval, and at least one further sequence of ramps following one another in time-offset fashion at the same time interval, the sequences being temporally interleaved with one another, of those ramps of the sequences which have an identical ramp index which counts the ramps in the respective sequence, that ramp of the respective further sequence exhibiting a time offset, associated with the sequence, with respect to the ramp of the first sequence, received signals being mixed down to baseband signals, (b) from the baseband signals a two-dimensional spectrum is calculated separately for each of the sequences by two-dimensional Fourier transformation, transformation occurring ramp for ramp in the first dimension and transformation occurring over the ramp index in the second dimension;

(c) based on a position of a peak in at least one two-dimensional spectrum of the baseband signals, values for the relative velocity of a radar target which are periodic with a predetermined velocity period are determined, (d) a phase relationship between spectral values that are obtained respectively at the same position in the separately calculated two-dimensional spectra is checked for agreement with expected phase relationships for several of the determined periodic values of the relative velocity, and (e) based on the result of the check, an estimated value for the relative velocity of the radar target is selected from the determined periodic values of the relative velocity.

The sequences are temporally interleaved with one another. In other words, the ramps of one sequence have ramps of the respective other sequences disposed in gaps between them. The term "interleaved with one another" is used here synonymously with the terms "intermeshed with one another" or "interwoven with one another."

An undersampling of the Doppler shift frequency occurs over the sequence of ramps, so that the information obtained regarding the relative velocity is affected by an ambiguity. In particular, the value of the relative velocity is periodic with a velocity interval $$\Delta v = \frac{c}{2f_0 T_{r2r}}, \quad (1)$$

where c is the speed of light, $f_0$ the average transmission frequency, and T2r the time interval between the ramps within a sequence. An ambiguity-affected value of the relative velocity of the radar target is therefore determined from a position of a peak, associated with the radar target, in a two-dimensional spectrum of the sampled baseband signals. The ambiguity can then be resolved by investigating how well those phase relationships between the signals of the sequences which are expected for the respective values of the relative velocity agree with the measured phase relationship. The expected phase relationship depends respectively on the relative velocity and on the time offset between the relevant sequences.

This allows an unambiguous estimate of the relative velocity within a velocity measuring range that can be, for example, a multiple of the unambiguity range of a measurement with only one of the sequences of ramps. It is advantageous in particular that relatively long time intervals are possible between the ramps, i.e., between the ramp center points, of a sequence, so that the hardware outlay can be reduced or a more accurate localization is enabled for the same hardware outlay.

The ramps are preferably disposed at irregular spacings within a period of the modulation pattern whose length corresponds to the time interval T2r, so that the modulation pattern exhibits as little symmetry as possible despite the regular time interval T2r. Because of the uniform time interval T2r, the time offsets between the ramps of different sequences repeat from one period to another.

Preferably, in step (e) of selecting an estimated value for the relative velocity of the radar target, the estimated value for the relative velocity is unambiguously determined in a measurement range for the relative velocity, an upper maximum value $v_{max}$ of the measurement range being related as follows to the temporal spacing T2r of the ramp center points within a sequence:

$T2r > c/(4f_0 v_{max})$ where c is the speed of light and $f_0$ the average transmission frequency. This corresponds to an undersampling of a maximum relative velocity $v_{max}$ of a radar target which is to be detected, by way of the ramps of a sequence which succeed one another at the temporal spacing T2r. Preferably T2r is equal to at least a multiple of the aforesaid variable on the right side of the equation.

Preferably, in step (e) of selecting an estimated value for the relative velocity of the radar target, the estimated value for the relative velocity is unambiguously determined in a measurement range for the relative velocity, an upper maximum value $v_{max}$ of the measurement range being related as follows to the respective time offset T12 of the respective further sequence:

$T12 > c/(4f_0 v_{max})$

Preferably T12 is equal to at least a multiple of the aforesaid variable on the right side of the equation. The hardware outlay for carrying out the method can be reduced by selecting such a relatively large time offset T12 between the sequences of the ramps, since the resulting ambiguity of the measured phase relationship can be permitted. This is because an unambiguous estimated value for the relative velocity can nevertheless be determined within the larger measurement region.

Advantageous embodiments of the present invention are described herein.

Preferably, successive ramps within a respective sequence have an identical ramp slope and an identical difference between their ramp center frequencies as well as, particularly preferably, an identical frequency swing, the aforesaid difference in the ramp center frequencies optionally being not equal to zero, and ramps that have the same ramp index in the respective sequences exhibiting the same ramp slope and the same ramp center frequency as well as, particularly preferably, an identical frequency swing. The phase relationships resulting from the relative velocity of a radar target can be measured particularly accurately if the frequency profile of all ramps of all sequences is identical, except for the frequency difference from ramp to ramp which is optionally selected to be not equal to zero.

The available measurement time can be utilized particularly effectively if the time offset between the sequences and the temporal spacing of the ramps within a sequence are of the same order of magnitude. Influences of an object acceleration on the phase relationship between the baseband signals of the individual sequences can furthermore thereby be minimized. Favorable values for the time offset between the sequences and the temporal spacing of the ramps within a sequence, which values are as "incommensurable" as possible (i.e., for example are not multiples of one another), can furthermore thereby be selected.

Resolution of the ambiguity then results in a particularly large measurement region for the relative velocity. The modulation pattern accordingly contains pauses between the ramps. In particular, the modulation pattern preferably exhibits at least one pause that recurs regularly between each two successive ramps of a sequence, with a time interval from one pause to another which is equal to the time interval between the ramps of a sequence.

Preferably, ramps of the respective sequences are disposed alternately during a predominant time span of the modulation pattern, i.e., the sequences largely overlap in time. Preferably the time offset, associated with a respective further sequence, between the ramps of the further sequence and the relevant ramps of the first sequence is less than twice the time interval between the ramps within a respective sequence, particularly preferably is less than that time interval. The latter is equivalent to saying that one respective ramp of the respective further sequence of ramps is always transmitted between two successive ramps of the first sequence.

Preferably the two-dimensional spectra calculated separately for each of the sequences are merged into one two-dimensional spectrum of the baseband signals, in particular into a power spectrum, that is used in step (c) of determining values for the relative velocity. The merger is, for example, non-phase-coherent, preferably a non-phase-coherent summation of the squares of the absolute values of the spectral values to yield a power spectrum. The detection of a peak can thereby be improved. In particular, the decrease in the signal to noise ratio of the separately calculated spectra, brought about by the distribution of the available measurement time into several sequences of ramps and by the pauses, can thereby be largely compensated for. Preferably a relationship in accordance with the equation $$\Delta \varphi_{12} = 2\pi \frac{2}{c} f_0 T_{12} v \quad (2)$$

is used in the context of checking the phase relationship, which equation correlates an expected phase difference $\Delta\phi_{12}$ between a phase of the spectral value of the respective spectrum of a further sequence and a phase of the spectral value of the spectrum of the first sequence, with the time offset T12 associated with the further sequence and with the relative velocity v, where c is the speed of light and $f_0$ the average transmission frequency. Instead of T12 and $\Delta\phi_{12}$ for the second sequence it is possible to write generally T1$i$ or $\Delta\phi_{1i}$ for the i-th sequence where i>1.

A control vector a(v), dependent on the relative velocity v, of the measurement, according to the equation $$a(v) = \frac{1}{\sqrt{1}} \begin{bmatrix} 1 \\ M \\ e^{2\pi j \frac{2}{c} f_0 T_{1i} v} \end{bmatrix}, \qquad (3)$$

is preferably used in the context of checking the phase relationship, where 1 is the number of sequences, i=1, ..., 1 counts the sequences, and in the i-th component of the vector T1$i$ (for i>1) is the time offset, associated with the i-th sequence, with respect to the first sequence. In this notation the control vector a(v) is a column vector whose components respectively describe the expected phase difference of the i-th sequence with respect to the partial measurement of the first sequence, the expected phase difference being respectively determined as a phase of a complex exponential function. The number of components of the vector is 1. The common pre-factor is a normalization factor and is equal to 1 divided by the square root of the number 1 of sequences used. In the exponent of the exponential function, j designates the imaginary unit unless otherwise indicated.

A knowledge of the control vector a(v) makes it possible to create an (under suitable conditions, unambiguous) relationship between the relative velocity v of the radar target and the received complex spectral values at the position of the peak, and to infer, from the phase relationships of the received signals, the relative velocity v of the radar target. But because in practice the received signals are more or less affected by noise, the velocity cannot be exactly calculated but can only be estimated, for example with the aid of a maximum likelihood estimate.

A measurement vector is defined, for example for one reception channel n, as $$a_m(n) = \begin{bmatrix} x_1(n) \\ \vdots \\ x_l(n) \end{bmatrix}, \qquad (4)$$

where i=1, ..., 1, in the i-th component of the vector $x_i(n)$ designates a complex spectral value of the two-dimensional spectrum of the sampled baseband signals of the i-th sequence of ramps of the reception channel n, where n counts the reception channels such that n=1, ..., N for N reception channels.

BRIEF DESCRIPTION OF THE DRAWINGS

Exemplifying embodiments are explained in further detail below with reference to the figures.

DETAILED DESCRIPTION OF EXAMPLE EMBODIMENTS

Figure 1:
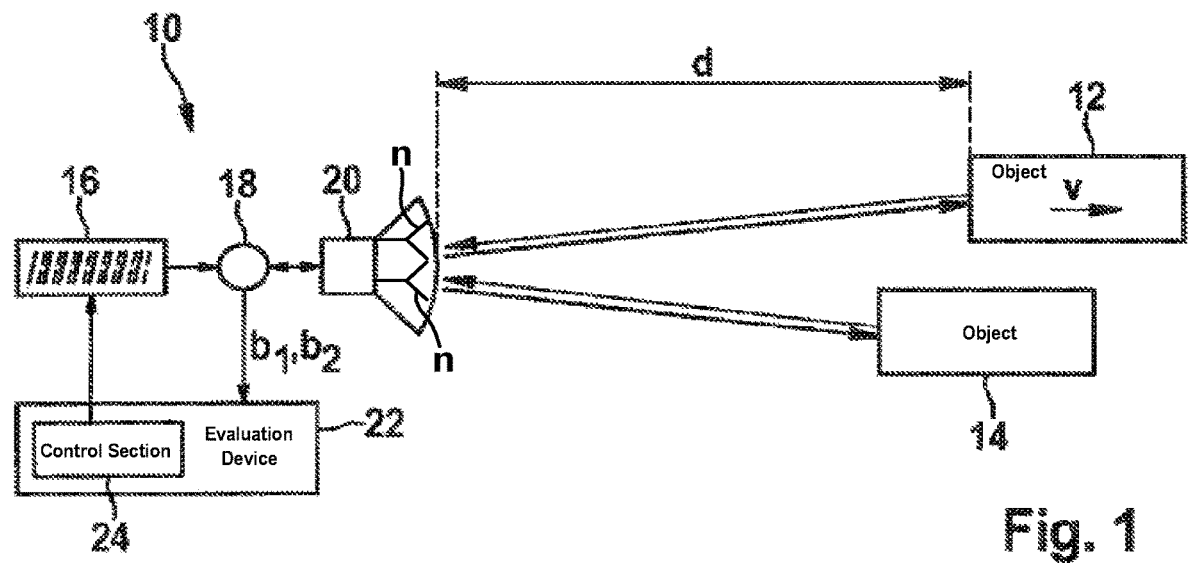
FIG. 1 is a block diagram of an FMCW radar system.

FIG. 1 is a simplified block diagram depicting an FMCW radar sensor 10 that, for example, is installed at the front in a motor vehicle and serves to measure distances d and relative velocities v of objects 12, 14, for example of preceding vehicles. Radar sensor 10 has a voltage-controlled oscillator 16 that supplies a frequency-modulated transmitted signal via a mixer 18 to a transmission and reception device 20 from which the signal is emitted toward objects 12, 14. The signal reflected at the objects is received by transmission and reception device 20 and mixed in mixer 18 with a component of the transmitted signal. A baseband signal b is thereby obtained, and is further evaluated in an electronic evaluation and control device 22. Control and evaluation device 22 contains a control section 24 that controls the functioning of oscillator 16. The frequency of the transmitted signal supplied by the oscillator is modulated within a radar measurement with sequences of rising or falling ramps.

Figure 2:
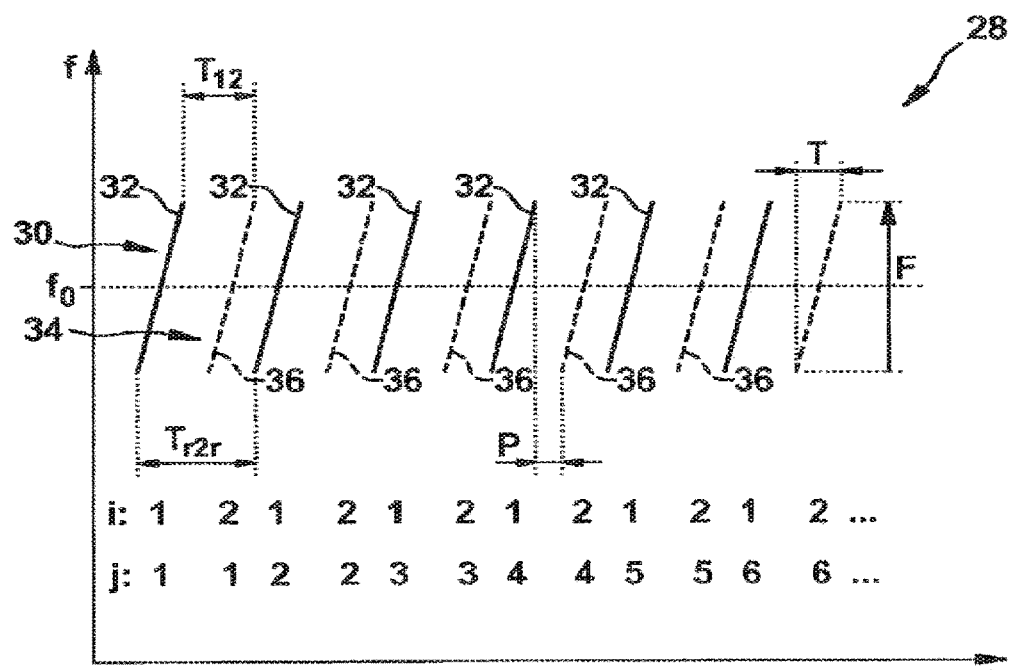
FIG. 2 shows a modulation pattern having two sequences of similar ramps which are transmitted with a time offset T12.

FIG. 2 shows the transmission frequency f of the transmitted signal 28 plotted against time t. Two sequences of ramps having identical ramp parameters, which are temporally interleaved with one another, are transmitted in the context of a measurement. A first sequence 30 of ramps 32 is depicted in FIG. 2 with solid lines, while a second sequence 34 of ramps 36 is depicted with dashed lines. The number i of the sequence to which a ramp belongs, and the respective ramp index j of the ramp within a sequence, are indicated.

The ramps 36 of the second sequence 34 are respectively shifted by a time offset T12 with respect to the ramps 32 of the first sequence 30 having the same ramp index j. Within each sequence 30, 34, the respective successive ramps 32 and 36 are shifted with respect to one another by a temporal spacing Tr2r. The temporal spacing Tr2r is thus identical for the two sequences. A pause P is also present between each two successive ramps of a sequence.

In the example depicted in FIG. 2, the difference in ramp center frequency between successive ramps 32, 36 within a respective sequence 30, 34 is equal to zero. All the ramps therefore have the same frequency profile. The ramp center frequency corresponds here to the average transmission frequency $f_0$.

Figure 5:
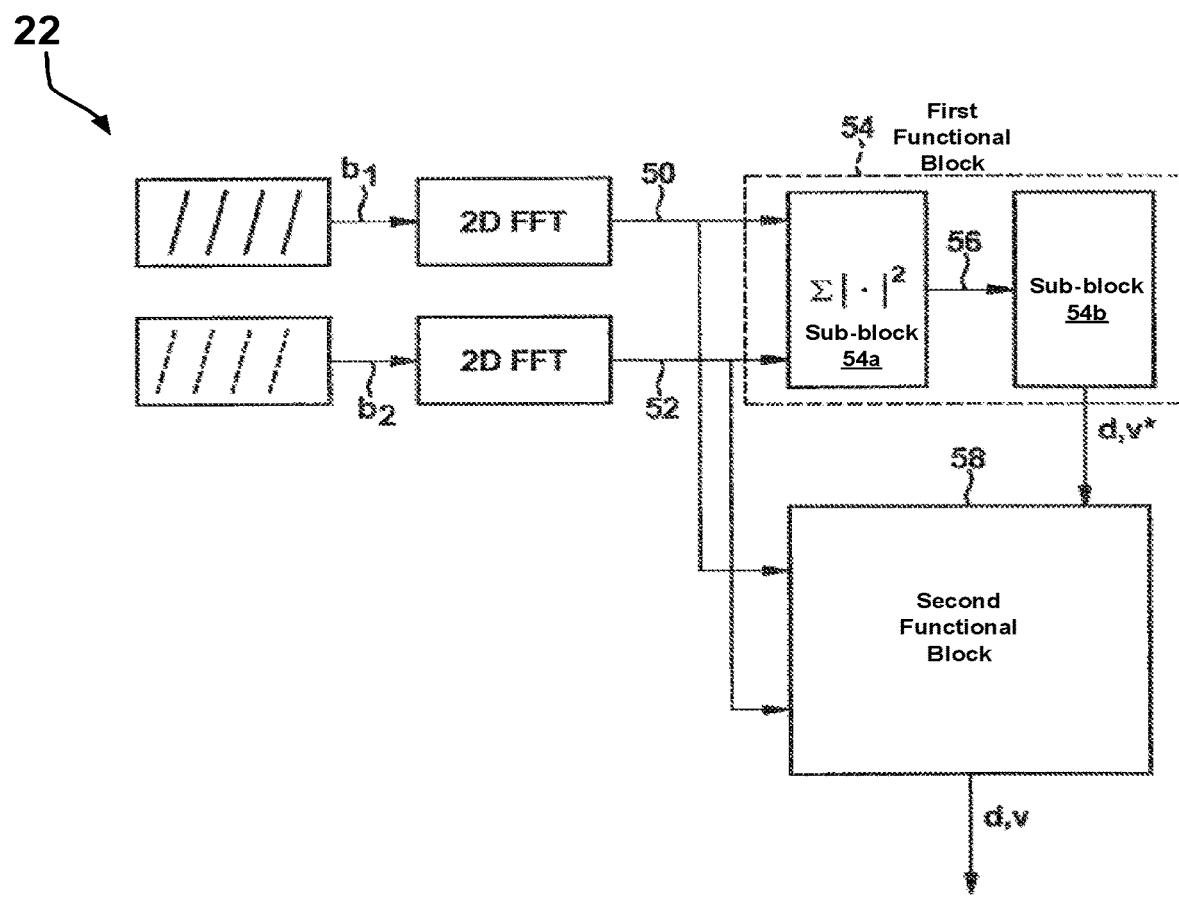
FIG. 5 is a more detailed block diagram of an evaluation device of an FMCW radar sensor.

FIG. 5 schematically shows a more detailed block diagram of the determination of the relative velocity carried out by control and evaluation unit 22.

The received, sampled baseband signals b1 and b2 that are respectively obtained for the corresponding sequence 30, 34 of the ramps are each subjected to a two-dimensional Fourier transformation (2D-FFT). The first dimension corresponds to a transformation of the baseband signals obtained for the individual ramps. The second dimension corresponds to a transformation over the sequence of ramps, i.e. over the ramp index j. The magnitudes of the respective transformations, i.e. the respective numbers of bins (sampling points or interpolation points), are preferably uniform for the first dimension for all spectra and uniform for the second dimension for all spectra.

Because of the relative velocity v of radar target 12 and the time offset T12 between the partial measurements corresponding to individual sequences of ramps, a phase difference occurs between the two partial measurements. The phase difference $\Delta\phi_{12}$ is described in equation (2). The phase difference between the two partial measurements is obtained as a phase difference between the complex amplitudes (spectral values) of a peak occurring at the same position in both two-dimensional spectra 50, 52. Because of the relatively large time offset T12 between the mutually corresponding ramps 32, 36 of the two sequences 30, 34, however, a determination of the phase difference between two partial measurements does not allow a direct inference as to the relative velocity v. The reason is that, because of the periodicity of the phases, for a single phase difference an ambiguity for the associated value of the relative velocity v results.

The two-dimensional spectra 50, 52 that are respectively obtained are delivered to a first functional block 54, which, in sub-block 54a, calculates a respective power spectrum from the complex spectra by squaring the absolute value of the respective spectral values and merges the two power spectra in point fashion, by summing or averaging, to yield an integrated two-dimensional power spectrum 56.

The position in the power spectrum 56 of a peak which corresponds to a radar target 12, which position is indicated hereinafter as bin k, l, corresponds to the position of the peak in the individual spectra 50, 52. From the first dimension, corresponding to bin k of the position of the peak, a linear correlation between the relative velocity v and the distance d of the radar target is obtained in accordance with the FMCW equation $k=2/c(dF+f_0vT)$, where c is the speed of light, F the ramp swing, T the ramp duration of an individual ramp 32, 36, and $f_0$ the average transmission frequency. If the frequency difference of successive ramps of a sequence is equal to zero, the peak position in the second dimension l contains only information regarding the relative velocity v of the radar target.

Figure 3:
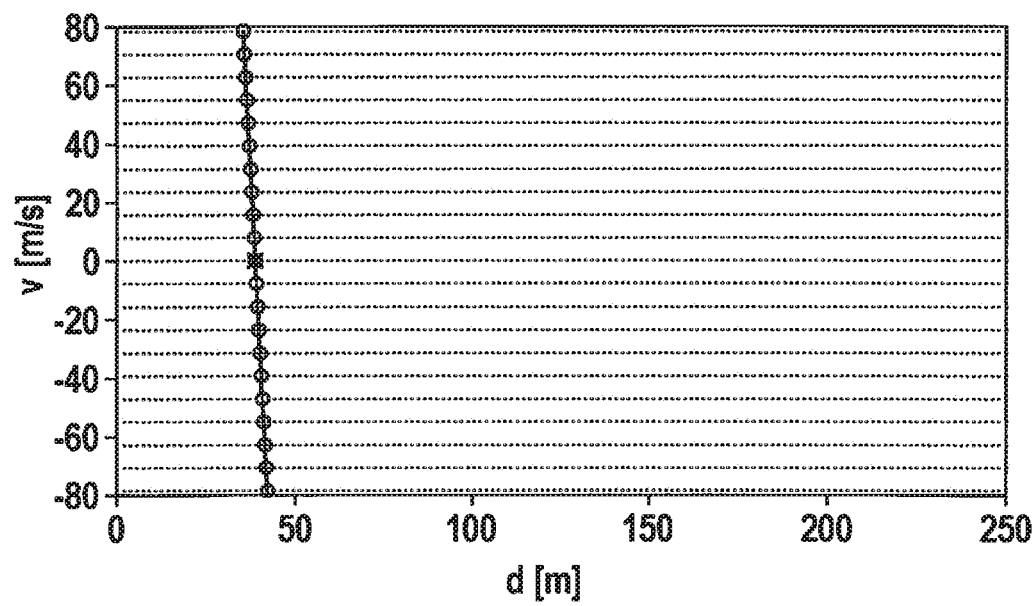
FIG. 3 is a velocity/distance diagram having values, periodic at a predetermined interval, of the relative velocity of a radar target.

FIG. 3 is a schematic diagram in which the relative velocity v is plotted against distance d. The linear relationship between v and d is plotted as a straight line. In the example depicted, because of a relatively large temporal spacing Tr2r, the information with regard to the relative velocity of the radar target obtained from sampling of the Doppler frequency is affected by an ambiguity in accordance with the predetermined interval according to equation (1), since the Doppler frequency resulting from the relative motion at the velocity v is not unambiguously sampled by the relatively large temporal spacings Tr2r. In addition to the v-d line that results in accordance with the frequency bin k, periodic values of the relative velocity v which were determined from the frequency bin l are depicted by dashed lines. The intersection points with the v-d line are marked. They correspond to possible value pairs (v, d) of the relative velocity and distance of the detected radar target 12. The actual target whose velocity v is to be determined is marked in FIG. 3 with an X.

The ambiguity of the ascertained velocity v is now resolved in the manner explained below. The information item v* regarding the relevant periodic values of the relative velocity v is conveyed by sub-block 54b, to a second functional block 58, which also receives the complex, two-dimensional spectra 50, 52 of the partial measurements.

In order to evaluate the measured phase difference, a control vector a(v) of an ideal measurement is calculated as a function of the relative velocity v in accordance with equation (3), which is written here, for two sequences, as:

$$a(v) = \frac{1}{\sqrt{2}} \begin{pmatrix} 1 \\ e^{2\pi j_c^2 f_0 T_{12} v} \end{pmatrix}.$$

The measurement vector $a_m$ is defined correspondingly; instead of the expected velocity-dependent complex values, the complex amplitudes (spectral values) at the position of the peak of the calculated two-dimensional spectra of the partial measurements are used as components of the vector, as indicated in equation (4). A normalization is accomplished in the definition below of the likelihood function.

Based on the measurement vector and the control vector, a normalized likelihood function in the form of a relative velocity spectrum S(v) is defined as:

$$S(v) = \frac{1}{|a_m^H|^2} |a_m^H a(v)|^2,$$

where $a^H_m$ designates the Hermitian-adjoint vector to the measurement vector $a_m$, i.e. a column vector in which the individual components are complexly conjugated with the components of the vector $a_m$.

Figure 4:
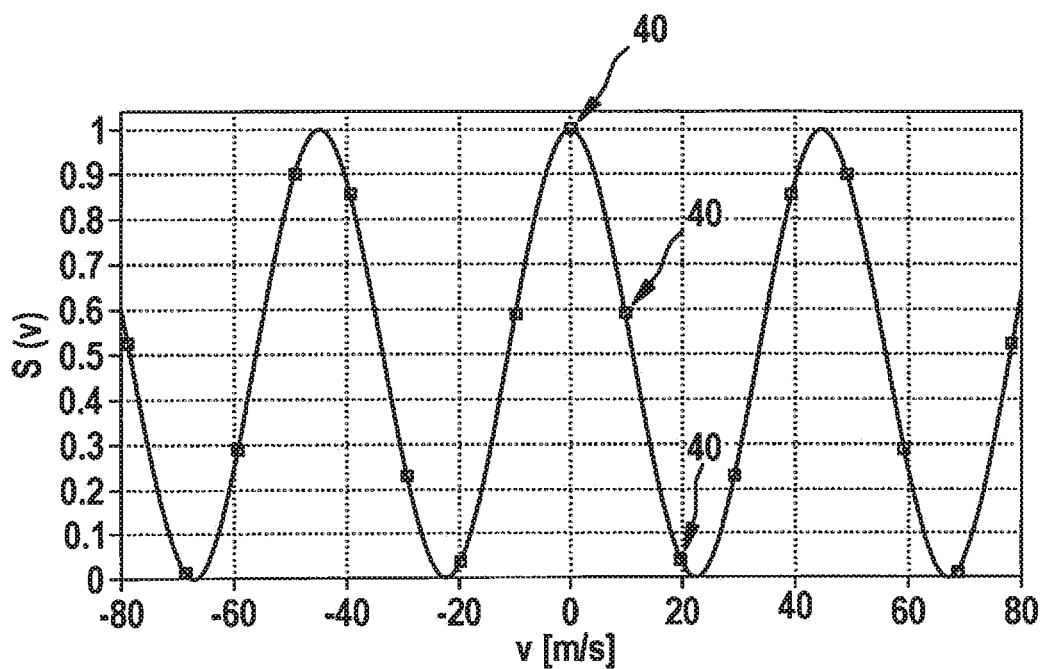
FIG. 4 is a diagram of a likelihood function for the parameter of the relative velocity.

FIG. 4 schematically shows, with a solid sinusoidal line, the relative velocity spectrum S(v) plotted against the relative velocity v. The maxima of the likelihood function correspond to the most probable values of the parameter v. Considered in isolation, the relative velocity spectrum S(v) is ambiguous: a maximum at the maximum value 1 corresponds respectively to an optimum agreement between the ideal phase shifts resulting for the relevant relative velocity v and the measured phase shifts in accordance with the measurement vector.

An evaluation of the function S(v) is only necessary, however, at the points 40 that correspond to those periodic values of the relative velocity v which were obtained from the evaluations according to the position of the peak in the bins (k, l). These points 40, which correspond to the velocity values of the intersection points marked in FIG. 3, are marked in FIG. 4 on the curve for the function S(v). In the example depicted, a maximum agreement is obtained at a relative velocity v=0 m/s, where the function S(v) assumes the expected maximum value of 1. This corresponds to the actual value of the relative velocity v.

The ambiguity that results from the position of the peak can thus be resolved by way of the additional information from the phase relationship. An estimated value for the distance d, pertinent to the selected estimated value for the relative velocity v, is determined based on the linear correlation.

The second functional block 58 outputs the ascertained estimated values for the relative velocity v and the distance d.

The time signals (baseband signals) corresponding to the different sequences of ramps are therefore firstly processed separately. Detection of a radar target 12 then takes place in the power spectrum 56 recovered by non-coherent integration. The ambiguity of the velocity v is then resolved based on the detection and on the complex amplitudes at the position of the peak.

The method described can be expanded for execution of a radar measurement with several receiving channels of a radar sensor. For example, several antenna elements n of transmission and reception unit 20 can correspond to a respective reception channel. For each channel, a measurement vector $a_m(n)$ according to equation (4) is then obtained for the n-th channel.

Second functional block 58 can output the complex amplitudes of the peaks, for example, to an angle estimator.

In accordance with the likelihood function indicated in claim 8 in the form of the relative velocity spectrum S(v), an investigation is then made of the extent to which phase relationships measured in the respective channels agree with the phase relationships of the channel which are expected for the respective relative velocity v. Preferably the non-coherent merger of the spectra to yield the power spectrum 56 is carried out in common for all channels.

The method described can moreover also be modified by the fact that a first sequence 30 of ramps 32, and at least two further sequences i=2, i=3 of ramps, are transmitted in temporally interleaved fashion. The further sequences of ramps have a different time offset with respect to the first sequence. For example, a time offset T13 between a ramp of the third sequence and the corresponding ramp of the first sequence is different from the time offset T12. The result is that the ambiguities can be even better suppressed, so that a larger temporal spacing Tr2r is made possible.

In individual cases it can happen that two radar targets having different distances and different velocities have the same peak position (k, l) in the spectrum 56. The measured phase relationship then cannot be associated with a single relative velocity of a single radar target. Evaluation device 22 can be configured to detect this type of measurement interference based on a deviation, exceeding a threshold value, of the maximum agreement, i.e., the maximum value of the relative velocity spectrum S(v), from the expected maximum value of 1. In this case, for example, second functional block 58 can output an interference signal. A temporarily occurring multiple occupancy of a peak in the two-dimensional power spectrum can also be recognized, however, from the fact that in the context of a tracking of detected objects carried out on the basis of the estimated values of v and d of a radar target 12, evaluation device 22 recognizes an incorrect detection over several measurement cycles.

Different modulation parameters of the ramps, for example different center frequencies, ramp slopes, temporal spacings Tr2r, and/or time offsets T12, are preferably used for several successively performed radar measurements. Random multiple occupancies of peak positions can thereby be limited to individual cases.

Instead of a non-coherent merger of the individual spectra to yield the power spectrum 56, it is also possible to group reception channels n together into one reception channel by digital beam forming. For example, respective weighting factors are added coherently, i.e., in consideration of the phase, to the spectra or measurement vectors of N reception channels. The summations over n are then accordingly omitted from the equations for S(v).

What is claimed is:

1. A method comprising:
(a) transmitting a ramp-shaped FMCW radar signal having a modulation pattern that includes a first sequence of ramps and a second sequence of ramps, wherein:
for all pairs of immediately temporally adjacent ones of the ramps of the first sequence and all pairs of immediately temporally adjacent ones of the ramps of the second sequence, a same time interval offsets the respective ramps of the respective pairs from each other; and
the first and second sequences are temporally interleaved with each other such that, with respect to each of all of the ramps of the first and second sequences that are not a temporally first or last one of the sequences, the respective ramp is, with respective time offsets, immediately temporally surrounded by others of the ramps that are not of the same sequence as the respective ramp;
(b) receiving signals;
(c) mixing the received signals into respective baseband signals for the first and second sequences, respectively;
(d) based on the baseband signals, calculating, by two-dimensional transformation, first and second two-dimensional spectra, wherein the first two-dimensional spectrum corresponds to the first sequence, the second two-dimensional spectrum corresponds to the second sequence, and each of the first and second two-dimensional spectra includes:
a respective first dimension whose data points each corresponds to a respective single one of the ramps of the respective sequence to which the respective spectrum corresponds; and
a respective second dimension whose data points each corresponds to a respective characteristic of a combination of the ramps of the respective sequence to which the respective spectrum corresponds;
(e) determining, based on a position of a peak in at least one of (1) the first two-dimensional spectrum, (2) the second two-dimensional spectrum, and (3) a two dimensional spectrum formed based on the first and second two-dimensional spectra, a plurality of relative velocity values of a relative velocity of a radar target, wherein the plurality of relative velocity values are periodic with a predetermined velocity period;
(f) for each of two or more of the determined periodic relative velocity values:
(I) calculating a phase relationship based on the respective relative velocity value;
(II) determining a phase relationship between first and second spectral values that are, respectively, in positions of the first and second two-dimensional spectra that correspond to each other; and
(III) comparing to each other (1) the phase relationship calculated based on the respective relative velocity value and (2) the determined phase relationship between the first and second spectral values to obtain a comparison result; and
(g) based on the comparison result, selecting one of the determined periodic relative velocity values as an estimated value for the relative velocity of the radar target.

2. The method as recited in claim 1, wherein:
all of the ramps of the first and second sequences have an identical ramp slope;
for each of the pairs of immediately temporally adjacent ones of the ramps of the first sequence, a difference between ramp center frequencies of the respective two ramps of the respective pair is the same for all of the pairs of the first sequence;
for each of the pairs of immediately temporally adjacent ones of the ramps of the second sequence, a difference between ramp center frequencies of the respective two ramps of the respective pair is the same for all of the pairs of the second sequence; and for each of the ramps of the second sequence, a respective center frequency of the respective ramp of the second sequence is the same as a respective center frequency of a ramp of the first sequence that has a same ramp index as the respective ramp of the second sequence, the ramp index identifying a position of the ramps, with respect to temporal order, in their respective sequences.

3. The method as recited in claim 2, wherein the identical difference is zero.

4. The method as recited in claim 2, wherein the identical difference is a non-zero difference.

5. The method as recited in claim 1, wherein a time offset between a ramp of the first sequence and a temporally immediately adjacent one of ramps that are not part of the first sequence is less than twice the time interval.

6. The method as recited in claim 1, wherein the ramps of the sequences have a same maximum to minimum frequency difference.

7. The method as recited in claim 1, wherein, in the determining of step (e), the plurality of relative velocity values are determined based on the two-dimensional spectrum formed based on the first and second two-dimensional spectra.

8. The method as recited in claim 1, wherein:
the comparing is performed according to an equation of $$\Delta\varphi_{12} = 2\pi \frac{2}{c} f_0 T_{12} v;$$

the phase relationship calculated based on the respective relative velocity value is a calculated phase difference $\Delta\varphi_{12}$ between a phase of the first spectral value and a phase of the second spectral value;
$T_{12}$ is a time offset between a ramp of the first sequence to a temporally immediately adjacent one or the ramps of the second sequence;
v is the respective determined periodic relative velocity value for which the comparing is performed;
c is the speed of light; and
$f_0$ is an average transmission frequency of the ramps.

9. The method as recited in claim 8, wherein:
for the each of the two or more of the determined periodic relative velocity values, the comparing includes calculating a square of an absolute value of a complex scalar product $a_m^H a(v)$ of a measurement vector $a_m$;
a(v) is a control vector that is dependent on the respective relative velocity value v;
components of the measurement vector $a_m$ are spectral values at the position of the peak in each of the first and second two-dimensional spectra;
$a_m^H$ is a Hermitian-adjoint vector to $a_m$;
components of the control vector a(v) are, except for a common normalization factor, the respective phase difference calculated based on the respective relative velocity value v; and
a first one of the components of the control vector a(v) is, except for the common normalization factor, equal to 1.

10. The method as recited in claim 1, wherein:
for the each of the two or more of the determined periodic relative velocity values, the respective comparison result obtained for the respective determined periodic relative velocity value is a respective value S(v), which is equal to $$\frac{1}{\sum_{n=1}^{N} |a_m^H(n)|^2} \sum_{n=1}^{N} |a_m^H(n)a(v)|^2;$$

N is a number of receiving channels n that are used;
$a_m(n)$ is a measurement vector whose components are spectral values at the position of the peak in each of the first and second two-dimensional spectra calculated separately for each of the receiving channels n;
$a_m^H(n)$ is a Hermitian-adjoint vector to $a_m(n)$; and
a(v) is a control vector that is dependent on a respective one of the relative velocity values whose components correspond to the phase relationship calculated for the respective relative velocity value.

11. The method as recited in claim 1, further comprising, based on the comparison result being that a degree of agreement between the phase relationships compared in step (f)(III) does not reach a predefined threshold, recognizing an interference in the phase relationship between the first and second spectral values, which corresponds to a situation in which two radar targets having different relative velocities occupy a same position in the at least one of the first two-dimensional spectrum, the second two-dimensional spectrum, and the two-dimensional spectrum formed based on the first and second two-dimensional spectra.

12. The method as recited in claim 1, wherein:
the position of the peak is determined with respect to each of the first and second dimensions;
based on the position of the peak with respect to the first dimension, a linear correlation between a distance and the relative velocity of the radar target is determined; and
the determination of the plurality of relative velocity values is based on the position of the peak with respect to the second dimension.

13. An FMCW radar sensor having a control and evaluation device deigned to:
(a) transmit a ramp-shaped FMCW radar signal having a modulation pattern that includes a first sequence of ramps and a second sequence of ramps, wherein:
for all pairs of immediately temporally adjacent ones of the ramps of the first sequence and all pairs of immediately temporally adjacent ones of the ramps of the second sequence, a same time interval offsets the respective ramps of the respective pairs from each other; and
the first and second sequences are temporally interleaved with each other such that, with respect to each of all of the ramps of the first and second sequences that are not a temporally first or last one of the sequences, the respective ramp is, with respective time offsets, immediately temporally surrounded by others of the ramps that are not of the same sequence as the respective ramp;
(b) receive signals;
(c) mix the received signals into respective baseband signals for the first and second sequences, respectively;
(d) based on the baseband signals, calculate, by two-dimensional transformation, first and second two-dimensional spectra, wherein the first two-dimensional spectrum corresponds to the first sequence, the second two-dimensional spectrum corresponds to the second sequence, and each of the first and second two-dimensional spectra includes:

a respective first dimension whose data points each corresponds to a respective single one of the ramps of the respective sequence to which the respective spectrum corresponds; and a respective second dimension whose data points each corresponds to a respective characteristic of a combination of the ramps of the respective sequence to which the respective spectrum corresponds;

(e) determine, based on a position of a peak in at least one of (1) the first two-dimensional spectrum, (2) the second two-dimensional spectrum, and (3) a two dimensional spectrum formed based on the first and second two-dimensional spectra, a plurality of relative velocity values of a relative velocity of a radar target, wherein the plurality of relative velocity values are periodic with a predetermined velocity period;

(f) for each of two or more of the determined periodic relative velocity values:
  (I) calculate a phase relationship based on the respective relative velocity value;
  (II) determine a phase relationship between first and second spectral values that are, respectively, in positions of the first and second two-dimensional spectra that correspond to each other; and
  (III) compare to each other (1) the phase relationship calculated based on the respective relative velocity value and (2) the determined phase relationship between the first and second spectral values to obtain a comparison result; and (g) based on the comparison result, select one of the determined periodic relative velocity values as an estimated value for the relative velocity of the radar target.

* * * * *